INVENTOR.
DAVID B. WITTRY

United States Patent Office 3,107,297
Patented Oct. 15, 1963

3,107,297
ELECTRON PROBE X-RAY ANALYZER WHEREIN THE EMITTED X-RADIATION PASSES THROUGH THE OBJECTIVE LENS
David B. Wittry, Pasadena, Calif., assignor to Applied Research Laboratories, Inc., Glendale, Calif., a corporation of Delaware
Filed Aug. 29, 1960, Ser. No. 52,640
15 Claims. (Cl. 250—51.5)

This invention relates to an improved instrument for rapid chemical analysis, the instrument being of the type commonly known as an electron probe X-ray analyzer and including means for quantitatively determining the chemical composition of a material by bombarding the material with electrons and measuring the resulting X-ray emission from the material.

Electron probe X-ray analyzers are known and, because an electron beam can be brought to a relatively fine focus, they have been found to be especially advantageous for use as micro-analyzers, that is, for determining the chemical compositions of relatively minute portions, or regions of a material. By using well designed electron optics, it is possible to limit the surface area excited by the electron beam to a diameter of less than one micron. Instruments of this type are especially useful, for example, in metallurgical analyses wherein it is often desired to determine the chemical compositions of various grains in a metallic specimen, or of material appearing in the boundaries between optically recognizable grains.

The basic components of an electron probe X-ray analyzer are: (1) an electron beam system, or probe, (2) a movable specimen stage, (3) means for viewing the surface of a specimen during an analysis, and (4) means for analyzing the X-ray emission from the specimen. The design of an instrument of this type necessarily represents a compromise because of space limitations. The electron beam system, the optical viewing system, and the X-ray analysis system all need to be in the immediate vicinity of the same selected area of the specimen. The focal length of the electron objective lens should be short in order to minimize its spherical aberrations; the electron beam should be normal to the specimen surface in order to facilitate accurate location of the probe on the specimen and to minimize spurious deflections when non-metallic inclusions are analyzed; the emergence angle of the X-rays sensed by the X-ray analysis system should be relatively high in order to provide a desirable line-to-background ratio and to minimize the effects of surface irregularities; and the viewing system should have a relatively large effective numerical aperture in order to achieve resolution comparable with the size of the region of the specimen being excited.

Several different arrangements have heretofore been proposed, but all have been subject to one or more relatively serious disadvantages such as, for example, excessive aberrations in the electron lens system; a low emergence angle for the X-rays, resulting in a relatively poor line-to-background ratio and rendering the system susceptible to errors due to relatively small irregularities, or unevenness in the surface of the specimen; a limited field angle available for viewing, with a consequent relatively poor resolution in the optical system; a high degree of interaction between the specimen and the focusing field of the electron objective lens; and undesirable limitations as to the size of the specimen that can be analyzed.

Some previous instruments have arranged the specimen at an acute angle relative to the electron beam in order to achieve a relatively high emergence angle, but this arrangement is subject to difficulties relating particularly to undesired deflection of the beam due to insulating anomalies in the specimen surface, greater inaccuracy in making corrections to the observed X-ray intensities to compensate for self-absorption in the specimen, and greater criticality in positioning of the specimen. In addition, when the specimen is arranged at an acute angle to the electron beam, the electron spot becomes an ellipse of larger area than the circular spot obtainable when the specimen is perpendicular to the beam.

A further disadvantage of previous electron probe X-ray analyzers relates to the spectrometer arrangement. In previous electron probe X-ray analyzers, the spectrometers have been arranged for scanning movement about an axis parallel to the electron beam, and for practical purposes, it is difficult to utilize more than a single spectrometer in each instrument. Moreover, in previous instruments, the self-absorption correction required varies with the wavelength setting of the spectrometer. Since X-ray spectrometers have only a limited spectral range, it is often necessary in such prior instruments to change the spectrometer crystal during the analysis and to make separate runs for different elements.

Accordingly, the basic object of the present invention is to provide an improved electron probe X-ray analyzer which overcomes to a high degree many of the disadvantages of previous instruments in its field.

Other objects are: to provide an improved electron probe X-ray analyzer including means for directing an electron beam perpendicularly upon a specimen to be analyzed, and means for measuring the resulting X-ray emission at a relatively high emergence angle, that is, in a direction relatively close to the direction of the electron beam, whereby background and self-absorption effects are minimized; to provide an improved instrument of this type including means for mounting plural spectrometers, which may be operated simultaneously for simultaneous determination of different respective elements in the specimen; to provide an improved instrument of this type including a movable stage for supporting a specimen at the focus of the electron beam, means for holding a plurality of specimens in stand-by positions within the vacuum chamber of the instrument and for selectively transferring the specimens from the stand-by positions to the stage without breaking the vacuum, the stage being arranged for rotational and cross-slide movement of the specimen while the specimen is supported at the focus of the electron beam; and, in general, to provide an improved electron probe X-ray analyzer which is of relatively simple and rugged construction, stable in operation, relatively easy to use, capable of highly accurate and precise quantitative analysis of all elements within the range of X-ray detection, and which is highly flexible and versatile in use.

The foregoing and other objects and advantages of the invention will become apparent from the following detailed description of a preferred embodiment thereof, taken in conjunction with the drawings, wherein.

In accordance with a first feature of the invention, a relatively high emergence angle for the detected X-rays is achieved in an electron probe analyzer, without sacrifice of the electron beam focusing quality, by providing an X-ray path extending through the objective lens of the electron optical system in a direction as close to the direction of the electron beam as can be achieved while still allowing for the placement of an optical microscope objective for visual observation of the specimen during analysis. The spectrometer is thus arranged to receive X-radiation emerging from the specimen at a relatively high angle, where the desired characteristic line emission is relatively intense and the background emission is relatively low. The use of a high emergence angle also reduces the effect of surface irregularities on the accuracy of the analysis.

One or more spectrometers are arranged in planes that include the electron beam axis, and scan the X-ray spectrum by motion in their respective planes. This arrangement permits the simultaneous use of plural spectrometers, arranged in a spoke-like pattern around the instrument, different ones being adapted to scan different parts of the spectrum.

A unique stage is provided for supporting the specimen to be analyzed. During operation, the specimen is maintained in a relatively hard vacuum, a required for optimum operation of the electron beam and maximum sensitivity to soft X-rays, yet it is desirable to provide for full cross-slide and rotational motion of the specimen during analysis, and also to provide for specimen interchangeability without breaking the vacuum.

These functions are achieved in the illustrated embodiment of the invention by a stage construction including a multi-specimen holder and a vertically movable rotatable spindle, both mounted upon a cross slide. The spindle includes a finger mechanism for grasping and securely holding a specimen, and is arranged for individually raising the specimens from the holder to the working position. Exteriorly projecting controls, are provided for actuating the cross slide, raising and lowering the spindle and rotating it, and for rotating the multi-specimen holder to position the different specimens successively at the spindle. When it is in its working position, the specimen may be translated by actuating the cross slide mechanism, or rotated by rotating the spindle.

The analyzer also includes an improved, relatively wide aperture optical microscope for viewing the specimen during an analysis.

Figure 1:
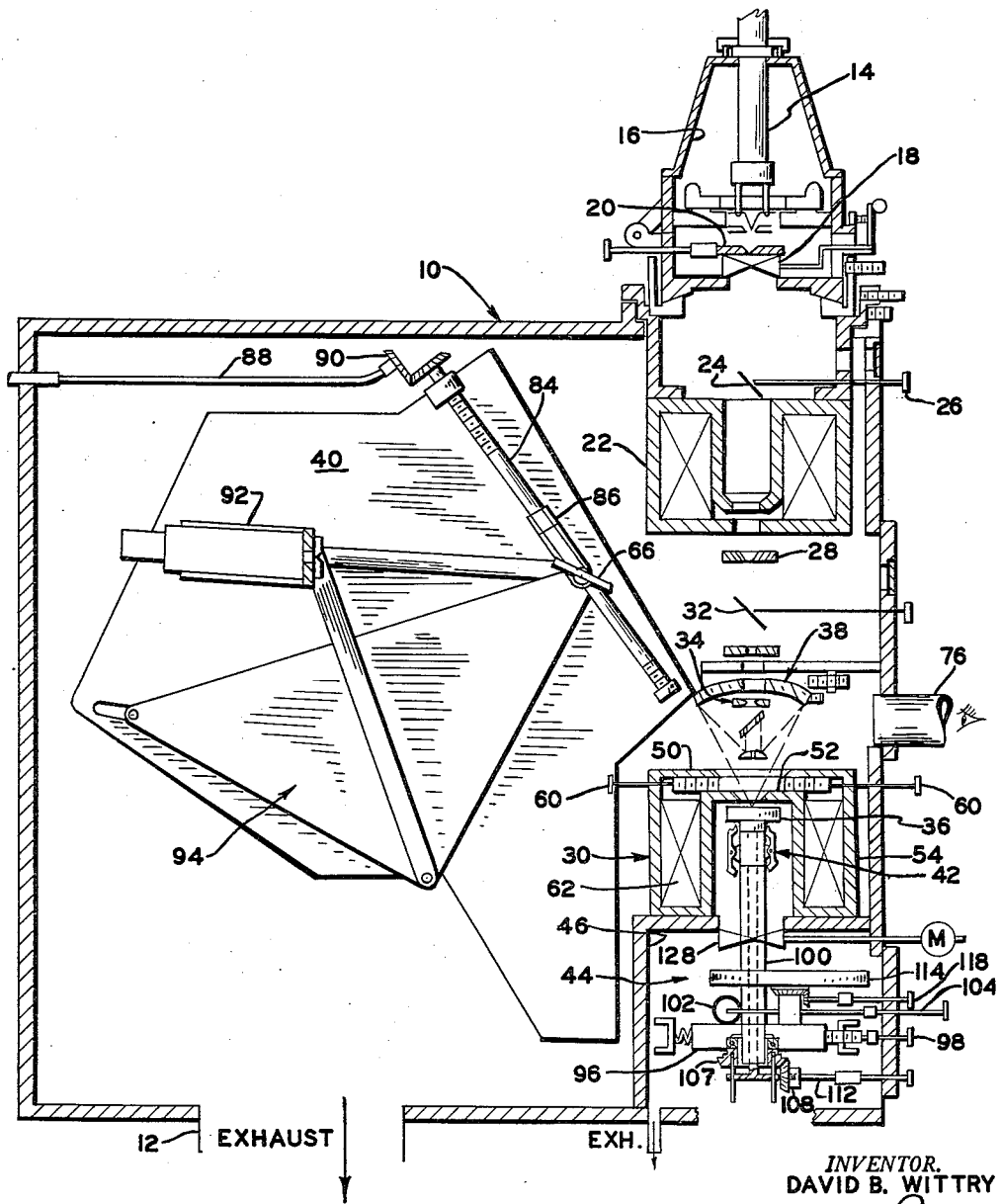
FIG. 1 is a partly schematic, vertical, sectional view of an electron probe X-ray analyzer according to the present invention.
Figure 2:
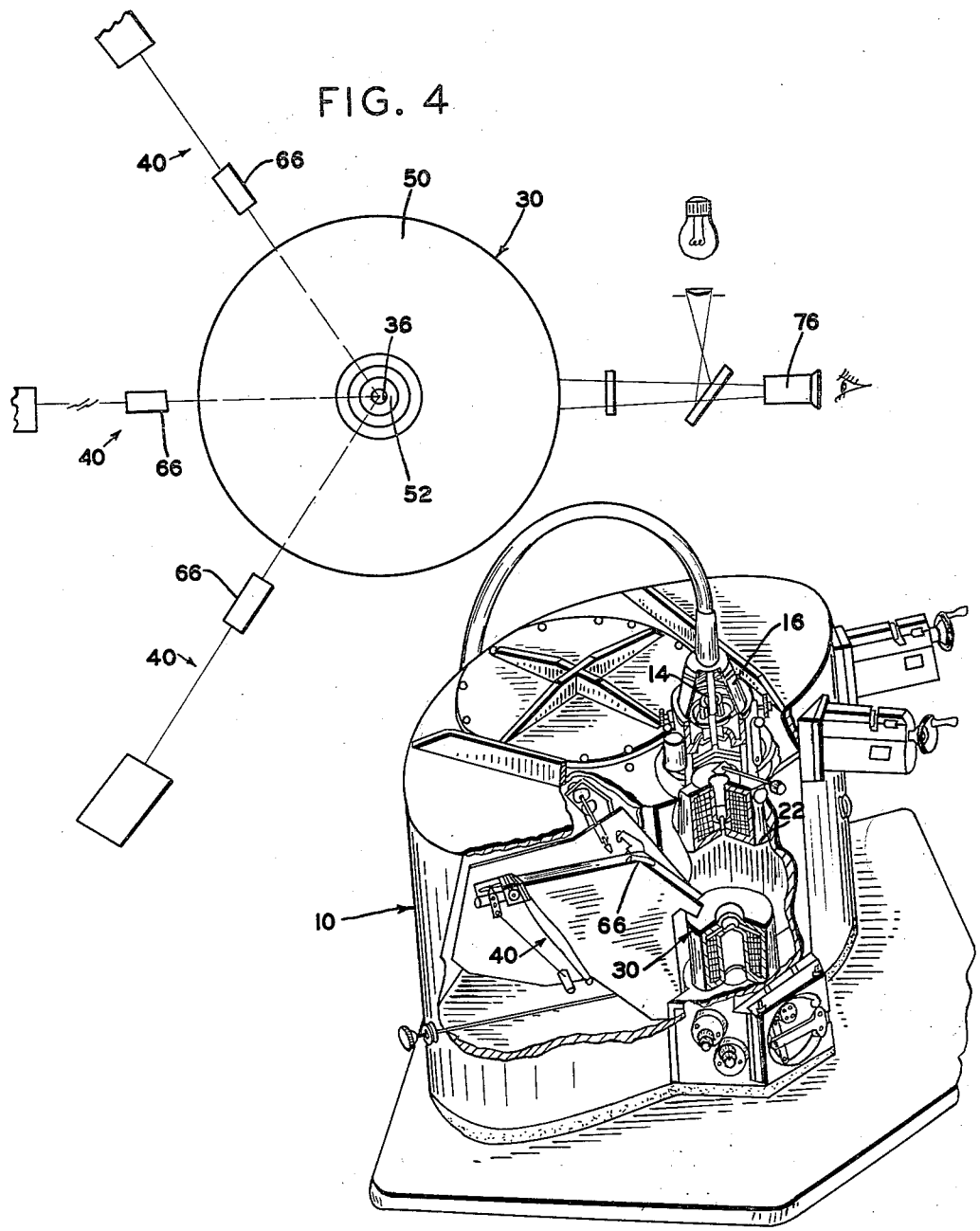
FIG. 2 is an isometric view, partly in section, of the analyzer shown in FIG. 1.

Referring now to the drawings, and particularly to FIGS. 1 and 2 thereof, which illustrate the over-all organization of an electron probe X-ray analyzer according to a presently preferred embodiment of the invention, the operating parts of the analyzer are mounted within a vacuum-tight shell 10, and any desired means (not shown) are provided for exhausting the shell through a main exhaust port 12. The arrangement is generally vertical. An electron gun 14 is mounted at the top of the shell within a separate chamber 16, which may be closed off by a gate valve 18 to facilitate changing of the filament (not separately designated) of the gun without breaking the vacuum in the main part of shell 10. The electron gun 14 is directed downwardly toward the electron-optical system, which includes a field diaphragm 20 and a condenser lens 22. A movable fluorescent screen 24 is mounted between the field diaphragm 20 and the condenser lens 22 for monitoring the electron beam during the initial set-up adjustments. The fluorescent screen 24 may be moved out of the path of the beam by means of an exteriorly projecting control knob 26.

The condenser lens 22 images the field diaphragm 20 upon a second diaphragm 28, from which the electron beam passes to the objective lens 30. A second fluorescent screen 32, and an aperture diaphragm 34 are mounted between the second diaphragm 28 and the objective lens 30. The second fluorescent screen 32 is generally similar to the first fluorescent screen 24, and, similarly thereto, is used for preliminary adjustment of the instrument and is moved out of the path of the electron beam during an analysis.

The specimen 36 is positioned at the focus of the objective lens 30 perpendicularly to the electron beam. An optical system including a reflecting objective 38 is mounted coaxially with the electron beam for visual observation of the specimen 36 during an analysis. X-radiation from the specimen 36 is detected and measured by a spectrometer 40, which is mounted in a plane including the electron beam axis, and arranged for receiving X-rays emitted from the specimen 36 at a relatively high emergence angle back through the objective lens 30.

The specimen 36 is held by a rotatable spindle 42, which is part of a stage 44 (described in greater detail hereinafter) arranged to permit selective interchange of various different specimens for testing and to permit controlled translational and rotational movement of the specimen for rectilinear or circular scanning during analysis.

The electron gun 14, the diaphragms 20 and 28, the condenser lens 22, and the aperture diaphragm 34 may be of any desired type and construction, and are not per se deemed to constitute part of the present invention. Their parameters are critical for optimum performance, particularly with respect to the size of the electron beam at the point where it impinges upon the specimen 36. In general, best results will be achieved when these parts of the instrument are well designed. The present invention, however, is concerned primarily with the design of the objective lens 30, and the arrangement of the spectrometer 40. The design of the objective lens 30 permits the utilization of X-rays emitted by the specimen 36 at a relatively high emergence angle, without sacrifice of quality in the electron optics, or of resolution and speed in the optical viewing system. The spectrometer arrangement permits the simultaneous use of several spectrometers without interference among them. In addition, the stage construction provides for full scanning movement of the specimen 36, while at the same time permitting a plurality of different specimens to be analyzed in sequence without breaking the vacuum either in the main body of the shell 10 or in the auxiliary chamber 46 within which the stage 44 is mounted. Details of these major features of the invention will be described in the following parts of the specification.

*The Objective Lens*

As shown, the objective lens 30 is of the axially symmetric magnetic type, but it will be appreciated that similar design principles may be incorporated in an axially symmetric electrostatic, quadrupole, or other type lens construction. The magnetic lens 30 is formed by a pair of magnetic plates 50 and 52, which are integrally connected to a depending annular coil housing 54 made of magnetic material. The magnetic gap is formed by conically tapered coaxial apertures 56 and 58 in the two plates 50 and 52, respectively, the two apertures 56 and 58 being shaped to lie upon the same conical surface, the apex of which lies at the focus of the lens under usual excitation conditions. Astigmatism of the lens may be corrected by adjusting six equiangularly spaced, radially extending screws 60 of ferromagnetic material, which are positioned between the two plates 50 and 52 and extend into the magnetic field of the lens. These screws 60 are adjusted for optimum focus of the electron beam.

The shape of the magnetic gap, being tapered in the direction of the electron beam, serves to minimize the magnetic field at the surface of the specimen 36, and to permit the analysis of ferromagnetic specimens without significantly affecting the electron optical properties of the lens 30. In an actual instrument according to the invention, the field at the specimen surface has been found to be less than about 10 gauss under normal operating conditions with a beam spot size of less than one micron diameter at the specimen surface.

The coil 62 within the housing 54 is preferably cooled by a liquid, which may be circulated in thermal contact with the coil 62 through a hollow annulus 64 by any desired means. Since the lens 30 is operated in a vacuum, ambient convection and conduction cooling are not available, and radiant cooling alone is generally inadequate, even though relatively little power need be dissipated. Liquid cooling minimizes the heating of the coil 62, and thereby minimizes out-gassing of the lens structure, which might otherwise constitute a virtual leak in the vacuum system. Liquid cooling is also preferably provided in the condenser lens 22 in those cases where the condenser lens 22 is magnetic.

Theoretically, for optimum signal detection by the spectrometer 40, the spectrometer crystal 66 should be positioned directly in line with the electron beam to receive X-rays emitted normal to the specimen surface. Such a construction presents problems, however, with respect to interference with the optical viewing objective and with the focusing means for the electron beam. According to the present invention, highly advantageous signal characteristics are achieved without interference with the optical viewing or electron focusing systems, by sensing the X-rays passing between the optical objective and the conical electron lens apertures 56 and 58.

In one model of the illustrated embodiment that has been built and successfully tested, the optical objective 38 subtends an angle of about 60°, providing a numerical aperture of about 0.4, and the cone defined by the magnetic lens apertures 56 and 58 includes an angle of about 90°. The spectrometer 40 is arranged to accept X-rays between these two angles, that is, X-rays emerging from the specimen 36 between the angles of 45° and 60° from the specimen surface. The X-ray axis between the crystal 66 and the specimen 36 thus forms an angle of about 52.5° with the specimen surface, and the maximum angle included by the crystal 66 is about 15°.

In contrast to known prior art electron probe microanalyzers, the coil housing 54 is disposed below the electron lens defined by the apertures 56 and 58, and the specimen 36 is positioned during analysis within the central, downwardly facing opening 68 of the coil housing 54. It is this arrangement, coupled with the conical shape of the lens aperture, that permits the achievement of the high emergence angle feature without sacrifice of quality in the electron lens or in the optical viewing system. A higher emergence angle may be readily achieved by reducing the aperture of the optical viewing system, but this would entail some sacrifice of resolution in the optical viewing system. It is presently thought that an emergence angle of 52.5°, and an optical numerical aperture of 0.4 represents a compromise closely approximating an optimum performance standard. A numerical aperture of 0.4, which is obtainable within the 60° field of the objective 38, provides a resolution of approximately one micron, which is fully adequate for most work.

*The Optical Objective and Viewing System*

The optical objective 38 includes a spherically curved, concave, annular mirror 70, which directs imaging light rays from the specimen 36 to a convex mirorr 72. The imaging rays pass from the convex mirror 72 to a flat, inclined mirror 74, and then laterally to an eyepiece 76. The electron beam passes through central apertures 78, 80, and 82 in the concave mirror 70, the inclined mirror 74, and the convex mirror 72, respectively.

*The Spectrometer*

The spectrometer 40 is mounted above and laterally of the objective electron lens 30 and generally in a plane that includes the electron beam. It may be of any desired type and, as shown, is of the focusing type, including a bent crystal 66 mounted for rotation upon itself and for rectilinear travel along the 52.5° emergence angle relative to the specimen 36. The crystal 66 is mounted upon a holder (not separately designated) which is driven by a screw 84 and follower nut 86 arrangement, the screw 84 being drivable by an exteriorly projecting drive shaft 88 through a bevel gear set 90. Any desired means (not shown) such as a cam or screw arrangement is provided for rotating the crystal 66 simultaneously with and in the plane of its linear travel to keep it properly oriented relative to the specimen 36. An X-ray detector 92 such as a Geiger-Mueller counter travels synchronously with the crystal 66, the linkage 94 being arranged to maintain the proper focal relationship between the specimen 36, the crystal 66, and the detector 92 throughout the range of adjustment of the spectrometer, and also to maintain the orientation of the detector 92 relative to the crystal 66.

The spectrometer motion shown is designed to roll the focal circle about the excited area of the specimen 36, maintaining the diameter of the focal circle constant throughout the entire scanning range, while the crystal 66 is moved along the line of the 52.5° emergence angle. The plane of the focal circle includes the electron beam axis, and the scanning motion of the spectrometer is limited to the plane of the focal circle.

The spectrometer 40 may be of the focusing type, as shown, or of any other desired type. If a non-focusing spectrometer is used, its plane is regarded as the plane including both the incident X-rays and the X-rays diffracted from the face of the crystal, that is, the plane of the Bragg angle. According to the invention, this plane includes the axis of the electron beam. It is this feature that facilitates the simultaneous use of plural spectrometers, all of the spectrometers receiving X-rays at the same emergence angle relative to the specimen surface.

The principal advantage of arranging the spectrometer 40 in a plane including the electron beam axis is illustrated in FIG. 4, wherein three spectrometers are shown arranged around the probe. More than three spectrometers may, of course, be used without mechanical interference among them, but for practical purposes, three spectrometers provide adequate coverage of the entire X-ray spectrum of interest in most current analysis work.

*The Stage*

The stage 44 for supporting the specimen 36 in the analysis position at the focus of the electron beam is mounted upon a horizontal cross slide 96, which is actuatable from the exterior of the shell 10 by two micrometer drive screws 98, only one of which is shown. The stage includes an elevator shaft 100, which is vertically slidable on the cross slide 96. A rack 101 is fixed on the shaft 100 in mesh with a pinion 102, which is actuatable through an exteriorly projecting drive shaft 104 for raising and lowering the shaft 100. The spindle 42 is rotatable within the elevator shaft 100 through a bevel gear set 107 and 108. The second bevel gear 108 of this set is fixed on a shaft 112, which extends exteriorly of the shell for manual or power drive, as desired. The other bevel gear 107 is rotatably mounted on the cross slide 96, and carries one or more axially extending rods 113. A notched disc 115 is fixed upon the spindle 42, and the rods 113 fit within the notches 117 for rotating the spindle 42 along with the bevel gear 107. The arrangement is similar in principle to a spline connection, but avoids large area surface contacts, which tend to be troublesome when operated in a vacuum.

A multi-specimen holder or selector 114 is also mounted on the cross slide 96 for supporting a plurality of specimens 36, which may be selectively raised by the spindle 42 to the analysis position. The selector 114 is a disk-shaped member rotatable on the cross slide 96 and drivable through a bevel gear set 116 by a projecting drive shaft 118. The selector 114 includes a plurality of angularly spaced axial bores 122 near its rim. Counterbores 120 are provided coaxially with the respective bores 122 at the upper ends thereof for receiving the specimens 36, which are prepared to fit relatively closely within the counterbores 120 and to rest centrally therein. The specimens 36 are prepared with central bosses 124 projecting from their surfaces opposite from the surfaces to be analyzed and smaller than the bores 122. When the specimens are placed in the selector 114, the bosses 124 project into the bores 122, leaving ample clearance for the spring biased retaining fingers 126 mounted on the spindle 42 to grasp the bosses 124. The fingers 126 are spring biased inwardly for holding the specimens 36 securely at the upper end of the spindle 42, and are cam actuated by the walls of the bores 122 as they pass through the bores for grasping and releasing the specimens.

Any desired type of universal and sliding shaft connections (not separately designated) may be used to connect the various driven parts of the stage to the exterior actuating knobs, although care should be taken to minimize the need for liquid lubricants. The arrangement provides for full two-dimensional translation of the specimen 36 when it is in its operative analytical position, and for full continuous rotation of the specimen, and also permits selection of any one of the specimens 36 supported on the specimen selector 114 without opening the auxiliary chamber 46 to the ambient atmosphere.

The Vacuum System

For convenience in operation, and to minimize the pump-down time required to achieve adequate vacuum in the instrument, as required for satisfactory operation of the electron beam and for full sensitivity with respect to relatively soft X-rays, the stage 44 is enclosed within the separate chamber 46 and may be isolated from the main shell 10 by a gate valve 128 so that the specimen selector 114 may be re-loaded without breaking the vacuum in the main shell 10. The gate valve 128 may be of any desired type, and, as shown, comprises a horizontally slidable plate 130 fitted with an O-ring 132 on its upper surface, which sealingly engages against the bottom of the horizontal vacuum wall 134 between the auxiliary chamber 46 and the main shell 10 when the valve is closed. A cam arrangement (not shown) is provided for breaking the O-ring 132 away from the wall 134 during the initial opening travel of the gate valve 128 away from its closed position. The arrangement is extremely compact, yet simple and reliable in operation.

Figure 3:
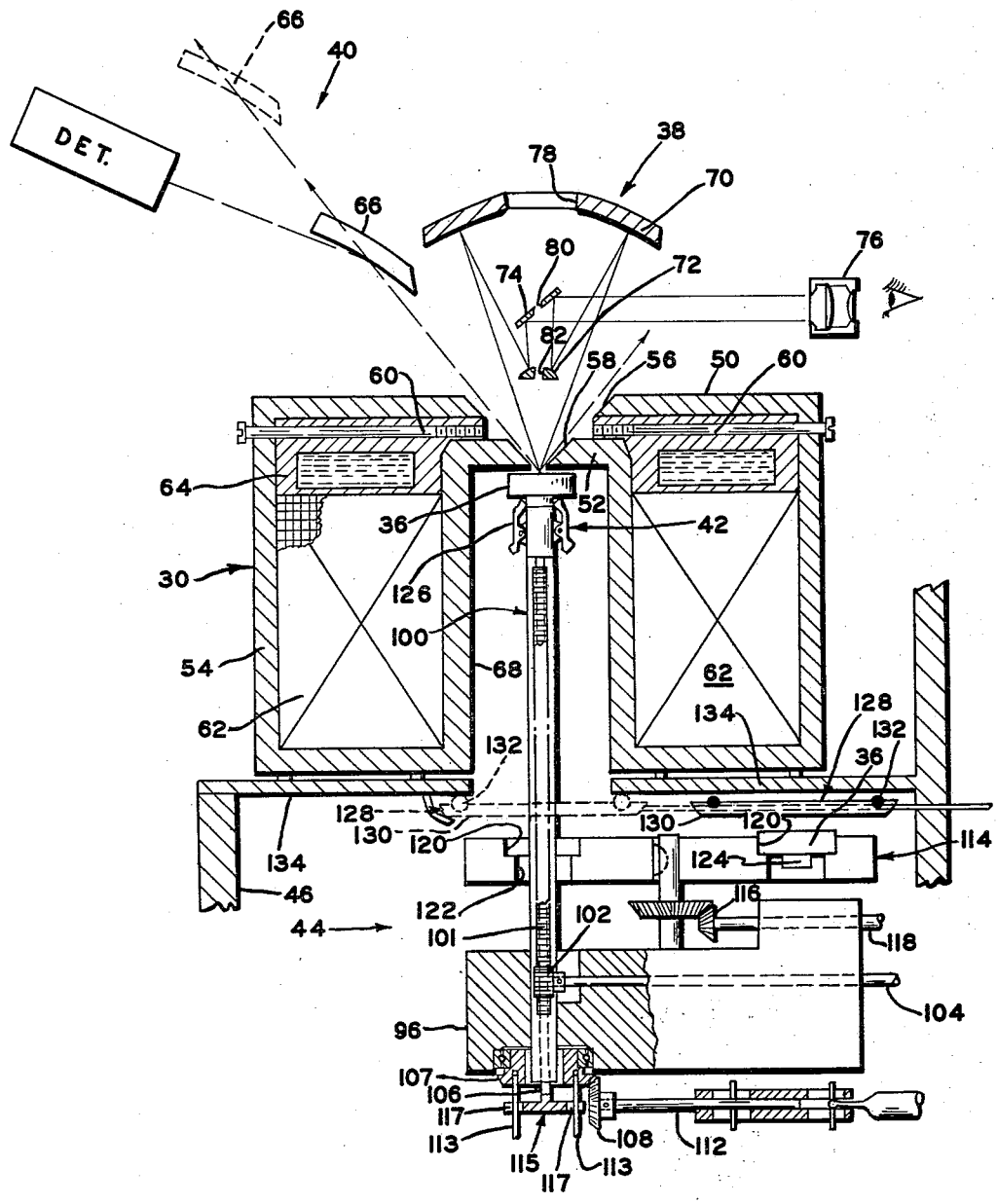
FIG. 3 is a partly schematic, fragmentary, vertical, thin section on an enlarged scale of the instrument shown in FIGS. 1 and 2, particularly showing the objective electron lens arrangement and associated structure; and, FIG. 4 is a schematic, plan view of the analyzer, particularly showing the spectrometer arrangement.

A separate fore-pump (not shown) is preferably provided for exhausting the auxiliary chamber 46, or, alternatively, the electron gun auxiliary chamber 16 before either one of these chambers is opened to the main shell vacuum. It has been found that there is no need for a diffusion pump-down of the auxiliary chambers before they are opened to the hard vacuum in the main shell. However, in order to facilitate the flow of air from the auxiliary chamber 46 into the main shell 10 upon the opening of the gate valve 128, the casing 54 of the objective electron lens is preferably spaced from the dividing wall 134, as shown in FIG. 3, so that the escaping air may proceed between the wall 134 and the casing 54 and not be confined to the relatively constricted path through the electron lens aperture 58.

What is claimed is:

1. Apparatus for irradiating a material with electrons and sensing X-rays emitted by the material in response to such irradiation comprising means for directing an electron beam upon the surface of a specimen material, an electron lens for focusing the beam upon a selected region of the specimen surface, and means for sensing X-rays emitted by the specimen in response to the electron irradiation and passing through said electron lens and emerging on the opposite side thereof from the specimen.

2. Apparatus for irradiating a material with electrons and sensing X-rays emitted by the material in response to such irradiation comprising means for directing an electron beam upon the surface of a specimen material, an electron lens for focusing the beam upon a selected region of the specimen surface, an optical viewing system including an objective for viewing the specimen material along an axis coincident with the electron beam, and means for sensing X-rays emitted by the specimen in response to the electron radiation and passing through said electron lens and emerging between said electron lens and said optical objective.

3. Apparatus for irradiating a material with electrons and sensing X-rays emitted by the material in response to such irradiation comprising means for directing an electron beam upon the surface of a specimen material, an electron lens for focusing the beam upon a selected region of the specimen surface, said electron lens including a member defining a magnetic gap coaxially aligned with and tapered in the direction of the electron beam, means for supporting a specimen adjacent to the apical end of said gap, and means for sensing X-rays emitted by a specimen so supported and passing through said lens.

4. Apparatus for irradiating a material with electrons and sensing X-rays emitted by the material in response to such irradiation comprising means for directing an electron beam upon the surface of a specimen material, an electron lens for focusing the beam upon a selected region of the specimen surface, said electron lens including a generally conical magnetic gap coaxially aligned with and tapered in the direction of the electron beam, means for supporting a specimen adjacent to said gap at the apical end thereof, an optical objective coaxially aligned with said gap adjacent to the base end thereof for viewing the surface of a specimen supported by said supporting means, said optical objective including an angle smaller than the angle of said gap, and means for sensing X-rays emitted by a specimen supported on said supporting means and passing therefrom through the annular space between said gap and the included angle of said optical objective.

5. Apparatus for irradiating a material with electrons and sensing X-rays emitted by the material in response to such irradiation comprising means for directing an electron beam upon the surface of a specimen material, said directing means including a magnetic lens for focusing the beam upon a selected region of the specimen surface, said magnetic lens including a plate member normal to the electron beam and having an opening therethrough coaxially disposed with the electron beam, and a coil housing extended from said member on the opposite side thereof from the point of origination of the electron beam, said coil housing being annular in form and having a central opening to permit placement of a specimen closely adjacent to said plate member on the same side thereof as said coil housing.

6. Apparatus for irradiating a material with electrons and sensing X-rays emitted by the material in response to such irradiation comprising means for directing an electron beam upon the surface of a specimen material, a magnetic electron lens for focusing the beam upon a selected region of the specimen surface, said lens including a pair of magnetic plates disposed transversely to the electron beam, said plates having apertures of different respective sizes coaxial with the beam to define a magnetic gap tapering in the direction of the beam, an annular coil housing extending from said plates in the same direction as the taper of said gap, means for supporting a specimen material within the central opening of said annular coil housing adjacent to the smaller one of said apertures, and means for sensing X-rays emitted by the specimen and passing through said apertures.

7. Apparatus for irradiating a material with electrons an dsensing X-rays emitted by the material in response to such irradiation comprising means for directing an electron beam upon the surface of a specimen material, a magnetic electron lens for focusing the beam upon a selected region of the specimen surface, said lens including a pair of magnetic plates disposed transversely to the electron beam, said plates having central apertures of different respective sizes coaxial with the beam, said apertures defining a magnetic gap tapering in the direction of the beam, an annular coil housing extending from said plates in the direction of the beam, means for supporting a specimen material within the central opening of said annular coil housing adjacent to the apical end of said gap, an optical viewing system for viewing a specimen so supported including an optical objective coaxial with and spaced from the larger end of said gap and subtending a smaller angle than said gap, and means for sensing X-rays emitted by the specimen through the region between said gap and the angle subtended by said objective.

8. Apparatus for irradiating a material with electrons and sensing X-rays emitted by the material in response to such irradiation comprising means for directing an electron beam upon the surface of a specimen material, a magnetic electron lens for focusing the beam upon a selected region of the specimen surface, said lens including a pair of magnetic plates disposed transversely to the electron beam, said plates having apertures of different respective sizes coaxial with the beam defining a magnetic gap tapering in the direction of the beam, the included angle of said gap being about 90°, an annular coil housing extending from said plate in the same direction as the taper of said gap, means for supporting a specimen material within the central opening of said annular coil housing adjacent to the apical end of said gap, an optical viewing system for viewing a specimen so supported including an optical objective coaxial with and spaced from the larger one of said apertures and subtending an angle of about 60°, and means for sensing X-rays emitted by the specimen through the region between the angle defined by said apertures and the angle subtended by said objective.

9. Apparatus for irradiating a material with electrons and sensing X-rays emitted by the material in response to such irradiation comprising means for directing an electron beam upon the surface of a specimen material, an electron lens for focusing the beam upon a selected region of the specimen surface, and an X-ray spectrometer for sensing X-rays emitted by the specimen in response to the electron radiation and passing through said electron lens in a direction opposite from the direction of the electron beam and at a predetermined angle relative to the specimen surface, said spectrometer including an X-ray diffraction crystal, and means for moving said crystal along a rectilinear path in alignment with and at said predetermined angle relative to the specimen surface.

10. An electron probe X-ray analyzer comprising means for supporting a specimen to be analyzed, means for directing an electron beam toward a specimen supported by said supporting means for exciting the specimen, said electron beam means including an objective lens for focusing the electron beam upon the specimen, and plural X-ray spectrometers for analyzing X-ray emission from the specimen, said spectrometers being arranged in planes including the electron beam and being angularly spaced around the beam and oriented to receive X-ray radiation emitted by the specimen back through said objective lens, whereby said spectrometers may be simultaneously operated without interference among them.

11. An electron probe X-ray analyzer comprising means for supporting a specimen to be analyzed, means for directing an electron beam toward a specimen supported by said supporting means for exciting the specimen, said electron beam means including an objective lens for focusing the electron beam upon the specimen, and plural X-ray spectrometers for analyzing X-ray emission from the specimen, said spectrometers being arranged in planes including the electron beam and angularly spaced around the beam, whereby said spectrometers may be simultaneously operated without interference among them, all of said spectrometers being oriented to receive radiation emitted by the specimen back through said objective lens at the same predetermined angle relative to the electron beam.

12. An electron probe X-ray analyzer comprising means for supporting a specimen to be analyzed, means for directing an electron beam toward a specimen supported by said supporting means for exciting the specimen, said electron beam means including an objective lens for focusing the electron beam upon the specimen, and plural X-ray spectrometers for analyzing X-ray emission from the specimen, said spectrometers being arranged in different respective angularly spaced planes intersecting along the axis of the electron beam and oriented to receive X-ray radiation emitted by the specimen back through said objective lens, each one of said spectrometers being of the focusing type and including a curved X-ray diffraction crystal, and means for moving said crystal along a rectilinear path and in rotation in the plane of the spectrometer.

13. Apparatus for irradiating a material with electrons and sensing X-rays emitted by the material in response to such irradiation comprising an electron gun, means for focusing electrons from said gun at a selected region in the apparatus, said focusing means being arranged to confine the electrons within a relatively narrow cone tapering toward said selected region, an optical viewing system having an optical axis coincident with the longitudinal axis of said narrow cone and arranged to receive light emerging from said selected region and passing through a conical annulus surrounding said cone, and means for sensing X-rays emerging from said region and passing through an outer conical annulus surrounding the first said conical annulus, said electron focusing means including an objective lens defined by a member that surrounds said outer annulus.

14. An electron probe X-ray analyzer comprising an electron gun, a magnetic objective lens of relative short focal length for focusing electrons from said gun at a selected region in said apparatus relatively close to said lens, means for supporting a specimen to be analyzed with its surface in said selected region, and an X-ray detection device for detecting X-rays emitted by a specimen so supported and passing from said region through said electron lens and within a predetermined acute angle relative to the magnetic axis of said lens.

15. Apparatus for irradiating a specimen with electrons and sensing X-rays emitted from the specimen in response to such irradiation, the apparatus including means for directing an electron beam toward a specimen, an electron lens for focusing the beam upon a selected region of the specimen surface, and means for producing an observable image of the selected region of the specimen surface, characterized by the fact that the X-ray sensing means is positioned between the electron lens and the source of the electron beam and laterally offset from the electron beam to sense X-rays passing through the electron lens in a direction opposite from and at an acute angle to the electron beam.

References Cited in the file of this patent

UNITED STATES PATENTS

| | | |
|---|---|---|
| 2,418,029 | Hillier | Mar. 29, 1947 |
| 2,580,675 | Grivet et al. | Jan. 1, 1952 |
| 2,750,512 | Meloy | June 12, 1956 |
| 2,805,343 | Lang | Sept. 3, 1957 |
| 2,897,371 | Hasler | July 28, 1959 |
| 2,908,821 | Schumacher | Oct. 13, 1959 |
| 2,939,954 | Ong | June 7, 1960 |
| 2,944,172 | Opitz et al. | July 5, 1960 |